(12) United States Patent
Cook

(10) Patent No.: US 10,671,982 B2
(45) Date of Patent: Jun. 2, 2020

(54) PAYMENT PROCESSING SYSTEM, APPARATUS AND METHOD IN REAL ESTATE TRANSACTIONS

(71) Applicant: Ashley Cook, Dallas, TX (US)

(72) Inventor: Ashley Cook, Dallas, TX (US)

(73) Assignee: ZOCCAM TECHNOLOGIES, INC., Dallas, TX (US)

( * ) Notice: Subject to any disclaimer, the term of this patent is extended or adjusted under 35 U.S.C. 154(b) by 612 days.

(21) Appl. No.: 14/703,907

(22) Filed: May 5, 2015

(65) Prior Publication Data

US 2015/0324762 A1 Nov. 12, 2015

Related U.S. Application Data

(60) Provisional application No. 61/991,555, filed on May 11, 2014.

(51) Int. Cl.
*G06Q 20/04* (2012.01)
*G06Q 20/32* (2012.01)
(Continued)

(52) U.S. Cl.
CPC ........... *G06Q 20/04* (2013.01); *G06Q 20/042* (2013.01); *G06Q 20/322* (2013.01); *G06Q 30/06* (2013.01); *G06Q 50/16* (2013.01)

(58) Field of Classification Search
CPC .... G06Q 50/16; G06Q 40/025; G06Q 50/167; G06Q 30/06; G06Q 20/042; G06Q 40/02
See application file for complete search history.

(56) References Cited

U.S. PATENT DOCUMENTS 8,442,906 B1  5/2013  Thomas
9,058,580 B1  6/2015  Amtrup et al.
(Continued)

FOREIGN PATENT DOCUMENTS

JP    2008234612 A  * 10/2008

OTHER PUBLICATIONS

Steven D. Levitt and Chad Syverson. Market Distortions when Agents are Better Informed: The Value of Information in Real Estate Transactions. The Review of Economics and Statistics. vol. XC. No. 4. Nov. 2008. (Year: 2008).*

*Primary Examiner* — Virpri H Kanervo
(74) *Attorney, Agent, or Firm* — Procopio, Cory, Hargreaves & Savitch LLP; Mark W. Catanese

(57) ABSTRACT

Disclosed is a method for processing of earnest money checks comprising the steps of: a. receiving a physical earnest money check from a buyer that is a party to a real estate purchase and sale contract for a real estate property, b. via a computing device connected to the Internet, accessing an online application for the processing of physical check payments, c. selecting a Send Earnest Money Check functionality in the application and at one or more prompts capturing a photo of an image of a front face of the physical check and an image of a back face of the check, and d. at one or more prompts inputting information for an earnest money payment transaction, the information comprising buyer information, the real estate property information and title company information for a title company that is approved by the buyer and a seller to the real estate purchase contract for managing escrow and closing.

11 Claims, 23 Drawing Sheets

(51) Int. Cl.
*G06Q 30/06* (2012.01)
*G06Q 50/16* (2012.01)

(56) References Cited

U.S. PATENT DOCUMENTS

| | | |
|---|---|---|
| 2002/0178122 A1 | 11/2002 | Maes |
| 2003/0187756 A1 | 10/2003 | Klivington et al. |
| 2004/0030631 A1 | 2/2004 | Brown |
| 2004/0143450 A1 | 7/2004 | Vidali |
| 2005/0288955 A1* | 12/2005 | Lewiss-Hachmeister ................... G06Q 30/02 705/38 |
| 2009/0088088 A1* | 4/2009 | Caswell ................ G06F 13/387 455/90.1 |
| 2009/0234764 A1 | 9/2009 | Friesen |
| 2009/0240550 A1* | 9/2009 | McCarty .......... G06Q 10/06311 705/7.13 |
| 2012/0078789 A1 | 3/2012 | Harrel |
| 2012/0109814 A1 | 5/2012 | Salzmann et al. |
| 2013/0080385 A1* | 3/2013 | Ho ........................ G06Q 40/06 707/613 |
| 2013/0155474 A1 | 6/2013 | Roach et al. |
| 2014/0279488 A1* | 9/2014 | Drake ................ G06Q 20/3223 705/42 |
| 2014/0375422 A1* | 12/2014 | Huber ................ G07C 9/00174 340/5.61 |
| 2015/0161587 A1 | 6/2015 | Khan et al. |
| 2015/0332418 A1* | 11/2015 | Wilson ................... G06Q 10/00 705/313 |
| 2015/0347990 A1 | 12/2015 | Cobbs |
| 2016/0098578 A1 | 4/2016 | Hincker |
| 2016/0275476 A1 | 9/2016 | Artman et al. |
| 2017/0093851 A1 | 3/2017 | Allen |

\* cited by examiner

Escrow check
- Current hand delivery method
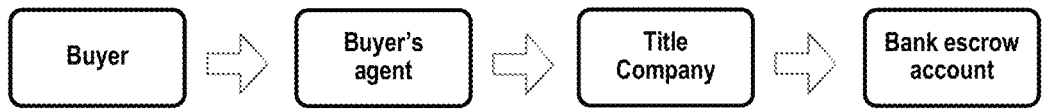
- Proposed electronic delivery method
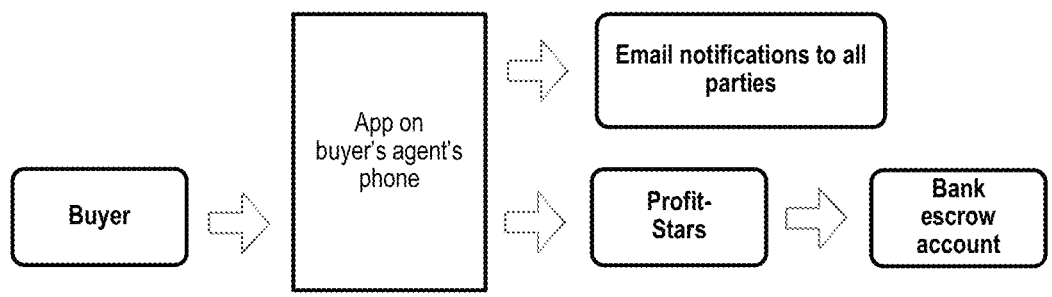
Figure 3

Option check
- Current hand delivery method
- Proposed electronic delivery method
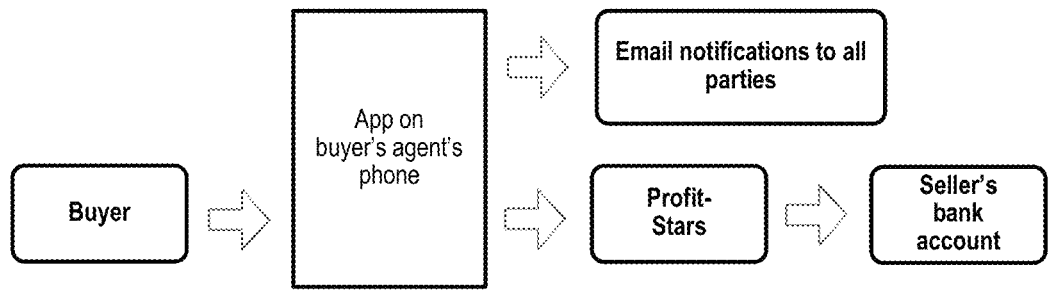
Figure 5

Title Company A

Frisco
7055 Preston Rd

Buyer:
Ronald Wilson

Amount:
$3,670.00

Selling agent contact info:

Delia@ransome.com

Seller name:

Sally Ride

Buyer name:

John Smith

Amount:

$345.00

[Send Check]

Figure 13

Branch Contact of ABC Title Company of TX

From: do-not-reply@company.com
Sent: Wednesday, November 19, 2014 10:15 AM
To: branchcontact@ABCtitlecompanyoftx.com
Subject: Earnest Money Delivery Dear Branch Contact:

Thank you for using us for your Earnest Money delivery.

The Buyer's Agent (buyeragent@broker.com) used us to deliver an Earnest Money check to your account. The details are below.

Please select this link to view and print the check image:

<u>View Check</u>

Property Address:    3709 Wooded Creek

Earnest Money Check Amount:  $1,000.00

Buyer name:        Susan Smith

Seller name:       William Adams

ABC Title Company of TX branch: Park Cities

Delivery Date:     11/19/2014

CONFIDENTIALITY NOTICE:

This email transmission is covered by the Electronic Communications Privacy Act, 18 U.S.C. 2510 et. seq., and any information contained in this message is legally privileged, confidential and is intended only for the individual or entity named herein. If the reader of this message is not the intended recipient, you are hereby notified that any discrimination, distribution or copy of this message is strictly prohibited. If you have received this message in error, please immediately notify us by telephone at +1 (555) 555-5555 and purge all copies of this message from your system.

[Earnest Title Company]

CONFIDENTIALITY NOTICE. This email transmission is covered by the Electronic Communications Privacy Act, 18 U.S.C. 2510 et. seq., and any information contained in this message is legally privileged, confidential and is

Figure 14

PAYMENT PROCESSING SYSTEM, APPARATUS AND METHOD IN REAL ESTATE TRANSACTIONS

CROSS-REFERENCE TO RELATED APPLICATION/CLAIM OF PRIORITY

This application claims priority to and incorporates in full by reference Provisional Patent Application 61/991,555 by inventor Ashley Cook entitled "Payment Processing system, apparatus and method in real estate contracting transactions" e-filed on May 11, 2014.

BACKGROUND OF THE INVENTION

This invention is directed to methods for making more efficient and secure the payment processes involved in consummating a binding real estate purchase transaction between a buyer and a seller, where the physical check payment processing is initiated by and managed by a buyer's real estate agent and not the buyer (payor). More specifically, this invention is directed to secure check image capture, electronic delivery and automated traceability of payments such as but not limited to earnest money and option fees in real estate purchase transactions. Remote deposit capture (thanks in part to US federal law called "Check 21"), online payment systems, computer-implemented systems relating to management of the closing phase of real estate transactions and including electronic payments involving electronic payment authorizations by payors using payors' computing devices including mobile phones are known and include U.S. Pat. No. 7,587,369 to Ginter et al., U.S. Pat. No. 7,085,735 to Hall et al., U.S. Pat. No. 7,860,766 to Seto et al., U.S. Pat. No. 8,165,939 to Reass et al., and U.S. Pat. No. 8,528,097 to Ginter et al and Publication 2014/0188701 by Sreedhararaj et al. However, applicants are not aware of web-based, electronic payment systems where a payor's authorized agent or representative initiates a payment processing request on behalf of the payor thus making contracting more efficient especially in the context of real estate purchase transactions while also enhancing security and RESPA compliance in handling of checks such as but not limited to earnest money checks. The applicant is not aware of web-based, mobile-enabled, secure and compliant payment processing systems directed to handling of physical check payments that typically are made at the stage when a buyer and a seller enter into a binding real estate purchase contract.

SUMMARY OF THE INVENTION the disclosed invention is directed to a novel web-based system, apparatus and method for the secure processing of selected payments involved in a real estate purchase transaction at the time of consummating a real estate purchase agreement. Thus, per the preferred embodiment for the processing of earnest money checks and option money checks in real estate purchase and sale transactions, the disclosed system is implemented as a mobile phone application where the user, an authenticated, licensed real estate agent (representing a buyer to the transaction), can initiate the payment processing via the user's mobile phone accessing the disclosed application (hosted on an application server on the Internet) via the user's mobile phone that is connected to the Internet via a mobile phone service provider network. Alternatively, the disclosed method can also be practiced using a user's desktop computer accessing the application hosted on an application server via a browser of the desktop computer.

When a buyer of real estate enters into a real estate purchase contract, typically the buyer writes an earnest money check and deposits it with a title company thus creating a binding contract between the seller and buyer of the real estate. The earnest money check shows that the buyer is a serious buyer and the earnest money in states like Texas is typically held in an escrow account by the title company designated in the real estate transaction. Typically the buyer's real estate agent hand carries the check to the title company. This process is inconvenient and inefficient. The buyer's agent incurs expenses in physically delivering the check to the title company and that can be done only during business hours. Moreover, the current method for delivery of the check creates risks for the real estate agent because the check can be lost or forgotten and never delivered. The agent and his/her real estate brokerage are liable for any damages the failure to deliver the check may cause to the buyer or seller. The known practice of delivery of checks in real estate transactions also increases the risk of unauthorized exposure of Non-Public Personal Information by the title company, the real estate agent and broker. The disclosed system for electronic delivery of the earnest money check addresses the known risks. The disclosed system provides for secure, automated processing of an earnest money check via a web-based, and including mobile phone application-based process initiated by an agent of the buyer via the agent's mobile device accessing the application. The disclosed application provides that an authorized (and application-authenticated) party, the buyer's agent (and not the buyer himself/herself), captures an image of a physical check written by the buyer and drawn on the buyer's bank account and perform further steps in accordance with the disclosed application to initiate and efficiently complete the payment transaction on behalf of the buyer.

The disclosed invention anticipates that the application applies to automatic processing also of other checks typically involved in a real estate transaction such as an option check that a seller sometimes writes in order to secure for the buyer the right to back out of a real estate purchase transaction by exercising the option. In order for a sale contract to be valid, this check must be received by the seller. The way that this is normally done currently is that the buyer gives a check to the buyer's agent, who hand-carries it to the seller's agent, who passes it to the seller, who deposits it. The problem with this method is that the check can get lost, or worse the seller could say he/she did not receive the option check thus making the option invalid and potentially unenforceable under the real estate purchase and sale contract. However, as per the disclosed invention, delivering the check electronically, with an electronic receipt (and an associated unique Transaction URL as described herein), provides evidence of the actual receipt of payment by the seller. Electronic payment services normally provide that the principals in the transaction are empowered to send or receive funds for themselves. The disclosed application for payment processing is directed to an intermediary/user who initiates the processing, namely the authorized party of the person writing the check. Additionally, the disclosed invention enables a secure delivery of payments to escrow accounts where Check 21 remote deposit capture is permissible while ACM is not permissible. The Check 21 law provides for a new negotiable instrument called a substitute cheek whereby banks may truncate original checks, process check information electronically and deliver the substitute checks as replacements for original checks. The invention is practiced via an application server that is in communication with a participating electronic payment service provider via a secure interface where the application server does not store title company escrow account information and merely stores title company and tide company branch identifying information. Furthermore, per the disclosed invention, the user's mobile phone also does not store financial account information.

Option checks are currently essential to house purchases in Texas (though not in all US states), and they are normally in small, nominal sums of money. The product development effort required to create a secure option check payment processing solution that works for all buyers and sellers may not be justified by the conventional per-transaction business model and may explain why the disclosed payment processing application is novel and not anticipated by prior art known to the applicant.

In a typical implementation of the disclosed invention, the provider of the application secures participation agreements from title companies and the financial institutions that manage escrow accounts of the title companies. During the implementation phase with any given participating title company and its financial institution, software testing includes the following elements: transmission connectivity, file format compatibility, MICR data transcription and parsing, TIFF image format compatibility, captured check image quality, check dollar amount, exceptions handling (e.g. when the user-input check amount does not match the actual amount of check), notifications of payment processing steps to the relevant users (buyer's agent, seller's agent, title company authorized representative) and electronic endorsement. Items captured by Mobile Remote Deposit Capture per the disclosed invention must have readable MICR information including but not limited to bank routing number, account number and (if present) serial number and the image in the proper orientation. The disclosed invention provides for a virtual endorsement step wherein an image of a back face of the physical check is captured and is acceptable only if it meets required image quality and TIFF image standards as required by financial institutions. Consistent with the Texas Department of Insurance's Minimum Escrow Accounting Procedures and Internal Controls (and such requirements by laws of other states), the virtual endorsement contains the words "escrow account" or "trust account" along with the name of the title company. Finally, per the disclosed method for handling of earnest money checks and option checks, the buyer may retain the original paper check and thus further minimizing the risk of accidental release of Non-Public Personal Information.

The disclosed system incorporates known, state-of-the-art capabilities for ensuring security and integrity of online processing of data. The application utilizes secure tokens, intrusion scanning, firewall management, multi-factor authentication and network and compute segmentation. Identity and Access Management role restrictions limits access to the application by authenticated users that are licensed, real estate agent, brokers, title company clerks and title company managers. Data in transit is encrypted and protected via Secure Socket Layer. A separate SSL certificate is used for each DNS domain in order to prevent cross-domain attacks with a root certificate. User passwords and check images are encrypted in transit via SSL. Data at rest is encrypted. Check images and data are removed from S3.

The steps for practicing the disclosed method for processing of earnest money checks comprise the following:

a. Prompted by the UI of the disclosed mobile application, a buyer's agent, who is an authenticated user of the application, causes image capture of the front face and back face of the physical earnest money check. A potential challenge in this step is to ensure that the image captured is complete and readable. The disclosed application provides for check image capture quality control checks to ensure the image is complete and readable. Image quality control includes for example the following requirements: (a) Image most accurately represent all of the information on the front face and back face of the check as of the time the check was truncated; (b) The images of the front face and back face of the check must be of similar dimensions, with the same orientation and similarly framed; (c) Images must be bi-tonal; (d) Images must be in the TIFF container and must meet relevant TIFF standards and (e) All TIFF tags must be supplied in the proper context and relationship to other tags. Image capture may for example be accomplished using known methods such as MITEK's patented software which includes 1QUA and duplicate image detection. It is important to note that the image capture of the disclosed invention is not equivalent to taking a picture of a physical check using a camera of a smartphone.

b. The mobile application captures data related to the check and transmits the data to the application server. A challenge in this step is the need to afford the user a seamless experience when Internet connectivity is intermittent or slow, ensuring that the transaction is secure, ensuring that the service responds acceptably quickly even under load, and ensuring that the service is reliably available.

c. The application server transmits the transaction data associated with the particular payment transaction to a third party financial transaction fulfillment (payment) service provider. At this step, the application must ensure security, transmission service uptime and availability, interoperability, auditability and recordkeeping.

d. The application server transmits a notification (and optionally a Check 21 check equivalent) to the Title Company and Title Company Branch whose escrow account is intended recipient of the check. The e-mail notification to the title company includes the following information: Name of the real estate agent who initiated the transaction and his/her e-mail address, (2) the address of the property that is the subject of the relevant real estate purchase and sale contract, (3) the amount of the check, (4) the name of the seller in the contract, (5) the name of the buyer in the contract, (6) name of the title company and the title company branch and (7) the date and time of delivery of the check. The captured image of the check is accessible to the title company through a secure log-in of an authorized representative of the title company who is a subscriber to the disclosed application. The copy of the check has a watermark which reads "Copy." Consistent with Minimum Escrow Accounting Procedures and Internal Controls, the title company representative may print the check image and the notification e-mail from the application server, place a relevant Guaranty File number and store these documents in the records of the title company, e. The application server transmits a confirmation of the payment transaction to the buyer's real estate agent, and optionally to the real estate broker/manager.

The method for processing of option checks in accordance with the disclosed system includes the steps similar to a, b and c above, except that in this case the buyer's agent is prompted to capture a photo image of the option check written by the buyer. The process for handling of option checks also includes the following steps:

d. The application server transmits a notification of the option check to the seller's real estate agent. The notification (email or SMS) contains a link to page on the application website bearing a unique transaction identifier describing details of the option cheek. The challenge in this step is to ensure secure delivery of the notification to the seller's agent and not an unintended recipient.
  a. The seller's real estate agent accesses a page on the application website via the link in the option check notification e-mail. When the seller's agent accesses the page via the link on the notification e-mail, such access constitutes the seller's receipt of the option check for the purposes of the contract. The buyer's agent and the title company receive notification that the seller's agent has accessed the link. At this step, the seller's agent is prompted to select a method for the delivery of the option fee payment to the seller, whether by e-mail or physical delivery by U.S. mail. The seller's agent is also prompted to enter the seller's address.
  b. The application server transmits payment to the seller at the address given by the seller's agent as follows:
    1. If by e-mail, the application server automatically sends the seller an email containing a link with a unique identifier to a page on the application website. When the seller accesses this link, he/she is prompted to choose whether to receive the payment electronically or by US mail. If electronically, the seller is prompted to input his/her bank account information, and the application automatically deposits the funds by ACH.
    2. If either the seller's real estate agent or the seller opts to deliver the option fee check by US mail 1, the application server automatically prints a check equivalent and mails it to the address given by the seller or his/her agent.

Disclosed is a non-transitory computer-readable storage medium comprising one or more programs configured to be executed by one or more processing units at a computer, the programs comprising instructions which cause the computer to perform operations comprising the steps of:
  a. Authentication of a first user comprising verification of a user real estate license number input by the user against a database comprising real estate license information,
  b. Prompting the first user to select a type of check payment to be processed where the type of check payment is in the group comprising earnest money check and option check,
  c. Upon the first riser's selection of a type of check payment to be processed, prompting the user to capture an image of a front face and a back face of a physical check in possession of the user, the check received by said first user from a buyer in connection with a real estate purchase and sale agreement between the buyer and a seller,
  d. Causing a capture of said images,
  e. Causing a verification of said images, the verification comprising checking for duplicate checks,
  f. Upon successful verification of the images, prompting the first user to input check information and to select a title company that is the intended recipient of the check as per agreement of the seller and the buyer to the real estate purchase and sale transaction,
  g. Receiving a send payment request,
  h. Generating a unique transaction identifier associated with the send payment request, the transaction identifier comprising images of the front face and back face of the check,
  i. Communicating the payment request to a payment service provider, the payment service provider transmitting the payment request to an authorized financial entity of the title company, said financial entity causing the crediting of said payment in the escrow account of the recipient and
  j. Communicating a payment confirmation to one or more users in a group comprising the first user and an authorized representative of the title company and a broker.

the disclosed invention comprises automated notifications to a listing or seller's agent of an option fee payment initiated by a buyer's agent to a real estate purchase transaction between the buyer and the seller. Thus, authentication is critical to ensure secure delivery of the payment to the correct, intended recipient. In any transaction wherein the seller or the seller's broker accesses the application website (upon receiving a notification of a payment transaction), they are required to authenticate themselves by entering the name of the buyer to the transaction of interest. The name of the buyer is as per the relevant real estate purchase and sale contract and is information that is not known to a malicious third party receiving the email in error.

Critical data elements that are automatically captured by the disclosed application are the source, amount and destination of the checks processed by registered agents/users of the disclosed application and the audit trail showing who (which user, whether buyer's agent or listing agent) did what and the timestamp for each action. The critical elements associated with each payment to be processed, including an image of the check, are embodied m the unique Transaction URL that is created for each payment transaction initiated by users of the disclosed application.

Thus, per a preferred embodiment of the disclosed invention, disclosed is a web-based system for the processing of physical checks in connection with real estate purchase transactions comprising A user computing device, An application server accessed by the user computing device over a communication network.

the application server comprising one or more user authentication modules, one or more check payment processing request modules, a check image processing module and a database comprising title company identifying information, a payment processing server in communication with the application server, the payment processing server receiving check payment transaction request information from the application server, the check payment transaction request comprising identifying information for a title company, the payment processing server generating a unique file associated with said payment transaction request and automatically transferring the transaction file to an authorized financial institution of the title company specified in the payment transaction file.

The disclosed invention contemplates and encompasses processing of additional payment transactions in connection with real estate transactions beyond the option check and the earnest money check. A sale of real estate may involve as many as twenty checks, including checks for payments for property repairs that may be required pursuant to the real estate purchase contract. Thus, per an additional functionality per an alternative embodiment of the disclosed system, there is provided a service for sellers, to be administered by the sellers' real estate agents, whereby payments to third party home repair contractors are processed through the disclosed application which comprises a unique database comprising a listing of the repairs required in the contract and where the application provides an automated, traceable confirmation when a payment is consummated for any given repair service. This audit trail will be helpful to the title company in ensuring at closing that all the repairs listed in the contract have been performed.

The disclosed application preferably utilizes the following methods of authentication, both involving a secret or confidential information that is unlikely to be known by an unintended recipient of the user's request for the destination account information:

a. The application server emails to the selling agent a link to a unique page on the website of the disclosed application. The selling agent types the seller's email address into the unique web page, and the application server automatically e-mails to the seller a link to an authentication page without providing information as to the selling agent's identity. The application then prompts the seller to input the street number for the property they are selling. The reason to avoid mention of the selling agent to the seller is that knowing the selling agent's identity, an unintended recipient of the link to the authentication page might look up that selling agent's listings and guess the property address. The problem with this method is that the Selling agent may directly forward to the seller the e-mail communication from the application server, thereby disclosing the selling agent's identity.
   b. The application server sends an e-mail communication to the selling agent including a link to a unique page on the application website. The selling agent forwards that email to the seller, the seller clicks on the link to access the application website, and the seller is required to input the name of the buyer. A seller will know the name of the buyer as per the real estate purchase agreement executed with the buyer.

Per the disclosed method for processing of an option fee check, while the buyer's agent initiates the payment processing, it is necessary that the seller' agent or listing agent take action in order to complete the processing of the option check to the seller's bank account. Accordingly, the disclosed system provides for an automated (e-mail) communication to the seller at the same time that the application sends an e-mail with the Transaction URL to the listing agent (and the reminder notices to buyer's agent).

The application server automatically sends e-mail reminders to the buyer's agent and the seller's agent (and any brokers associated with the transaction) so long as the option fee payment processing transaction remains incomplete, meaning that the listing agent has not successfully accessed the link containing the unique Transaction URL associated with the option fee payment. The agent subscribing to the disclosed application is able to specify the reminder intervals for such reminder communications to the listing agents.

While the disclosed payment system per a preferred embodiment is directed to users who are agents of buyers to a real estate transaction, the disclosed web-based, mobile application may be used by any buyer to a purchase transaction involving a vendor or service provider. Thus, in accordance with the disclosed application, the user/buyer may initiate an automated e-mail communication to an application-participating vendor or service provider asking the latter to specify (opt in) a preferred method for the delivery of a payment from the user/buyer, whether ACH or via physical check delivery. A method for authentication is where the recipient takes a photo of one of the recipient's own blank checks to give the destination account info thus validating that the recipient is the owner of the destination account.

BRIEF DESCRIPTION OF THE DRAWINGS

FIG. 3 is a schematic giving an overview of the prior art method and disclosed method for processing of an escrow check in a real estate purchase transaction.

FIG. 5 is a schematic giving an overview of the prior art method and disclosed method for processing of an option fee check in a real estate purchase transaction.

FIG. 13 is a sample screen shot that is part of the UI for processing of option fee money payments in accordance with the preferred embodiment of the disclosed mobile-enabled application for payment processing.

DETAILED DESCRIPTION OF THE DRAWINGS

Figure 1:
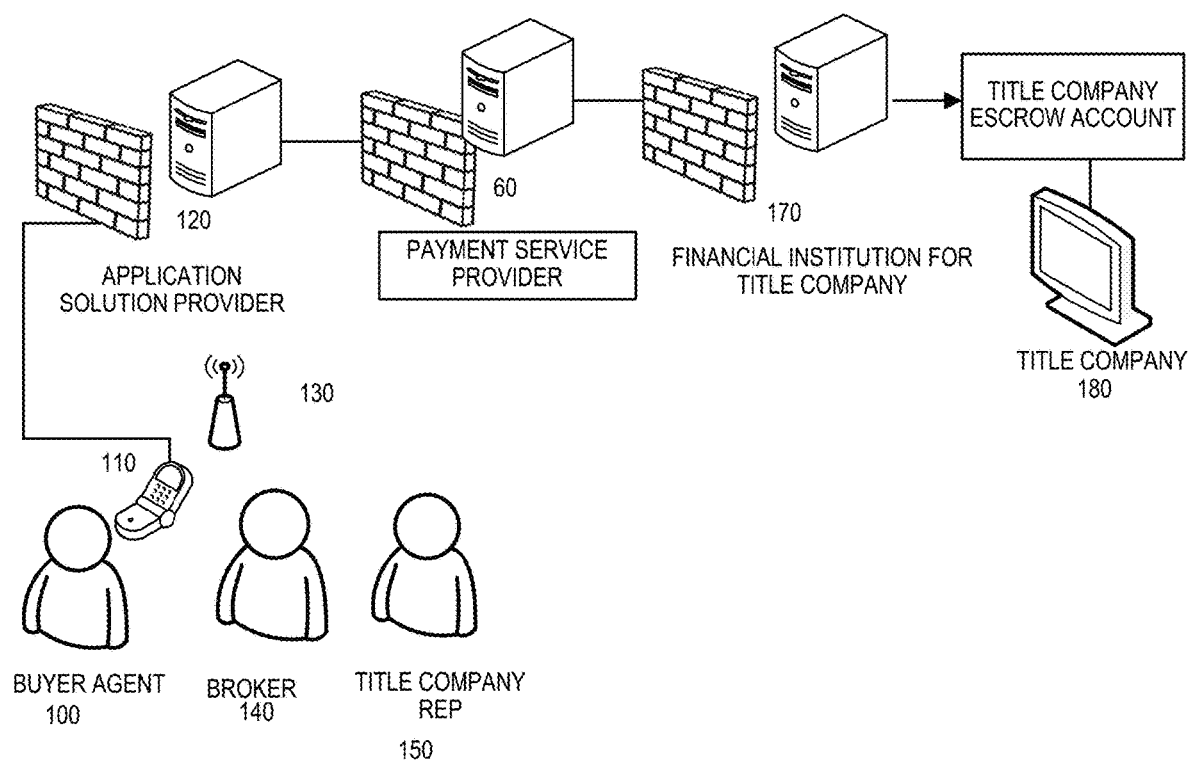
FIG. 1 is a schematic showing the major entities per the preferred embodiment of the disclosed system for mobile deposit capture and processing of earnest money check payments.

FIG. 1 is a schematic showing the major entities and their connectedness per the preferred embodiment of the disclosed system for secure mobile deposit capture and processing of earnest money and option check payments. Thus shown are licensed real estate buyer agents 100 who are authenticated users of the disclosed application and who via user computing devices 110 access the disclosed application server 120 over a mobile network provided via a mobile network service provider 130. Shown also are broker users 140 and title company representatives 150 who are authorized and registered subscribers of the application. The application server 120 is in communication with one or more participating electronic payment service provider entities 160 and the latter are in communication with one or more participating financial institution entities 170 which are authorize financial institutions holding escrow accounts of title company entitles 180.

The terms title company and title companies used in this application shall be deemed to refer to title companies and shall also include other entities that are used by real estate agents and brokers and the parties in a real estate purchase and sale transaction for the handling of escrow accounts an disbursements of funds pursuant to a closing in connection with the real estate purchase and sale transaction.

Figure 2:
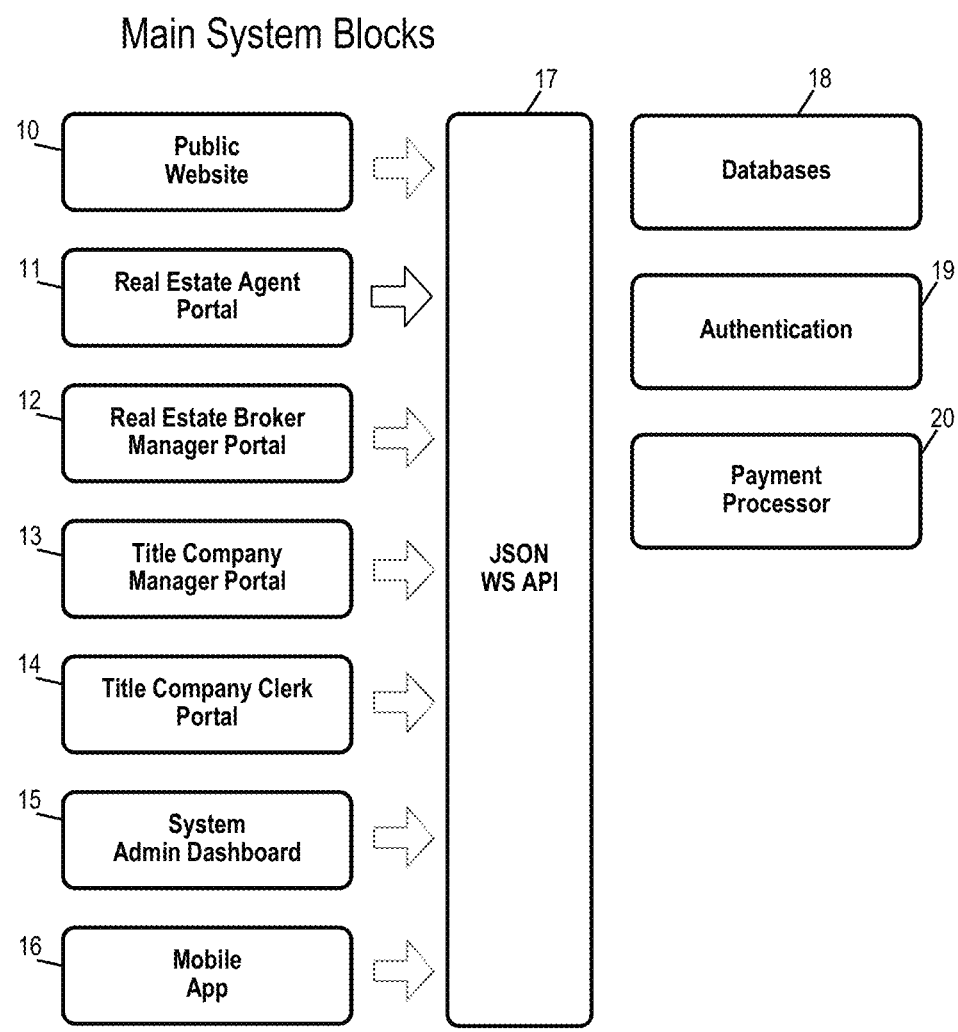
FIG. 2 is a block diagram showing the major component blocks of the disclosed payment processing system per a preferred embodiment involving a mobile phone application.

FIG. 2 is a block diagram showing the major component blocks of the disclosed payment processing system per a preferred embodiment comprising a mobile phone application. The disclosed system comprises a website application 10, a portal especially for real estate agents 11, a real estate broker manager portal 12, a title company manager portal 13, a title company clerk portal 14, an application administrator dashboard 15, a mobile phone-enabled application 16, with an API interface 17 (such as JSON WS API) operatively connecting the application to Databases 18 (e.g., Payment Transaction Database, Title Company Database, Real Property Database), an Authentication service application 19 and a trusted third party electronic payment processing service provider 20.

FIG. 3 is a schematic giving an overview of the prior art method and disclosed method for processing of an escrow check in a real estate purchase transaction.

Figure 4:
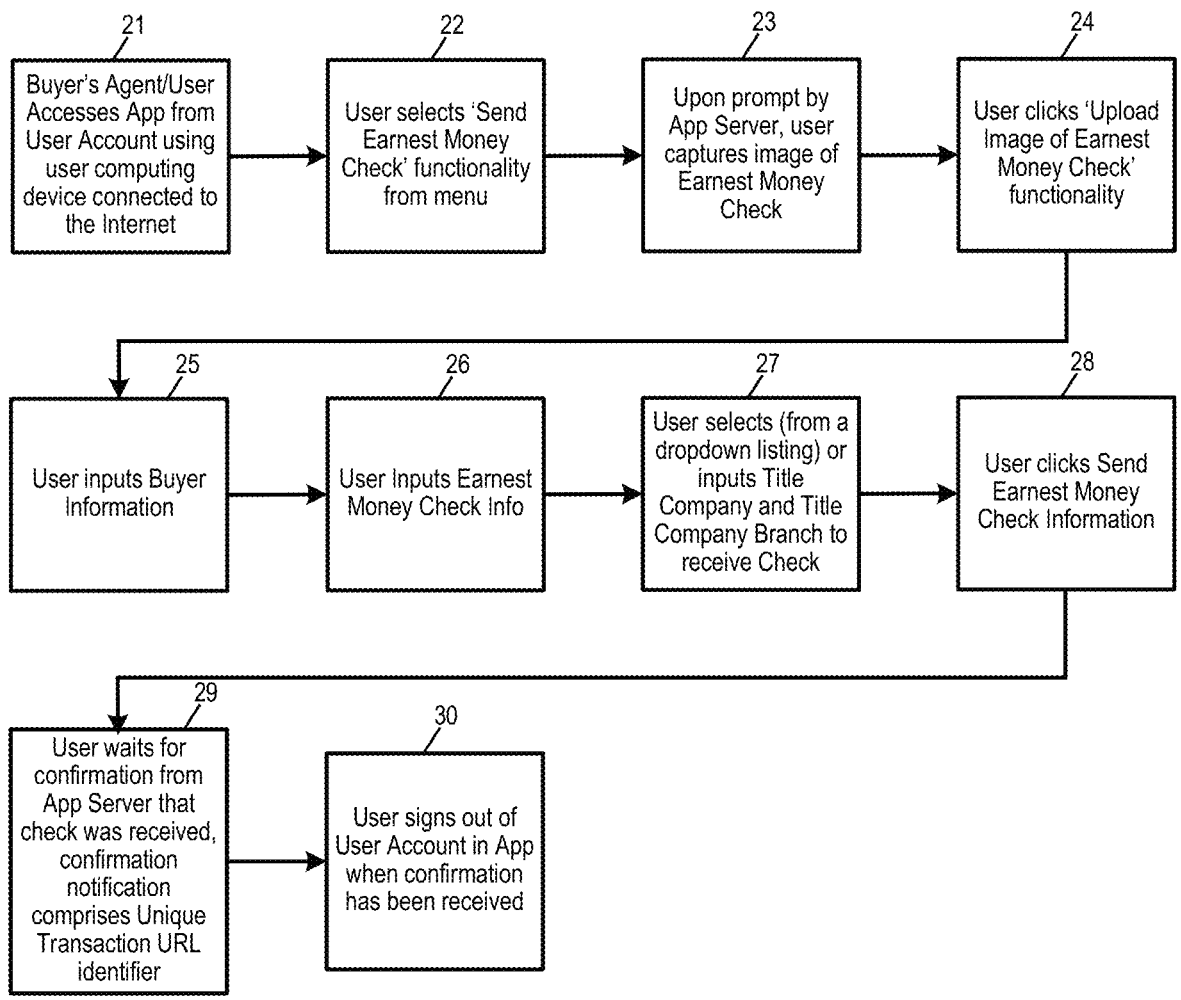
FIG. 4 is a block diagram showing steps in practicing the disclosed method for processing of an earnest money or escrow check in a real estate purchase transaction in accordance with an embodiment of the disclosed process.

FIG. 4 is a block diagram showing steps in practicing the disclosed method for processing of an earnest money or escrow check in a real estate purchase transaction in accordance with an embodiment of the disclosed process. Thus, per Step 21, the buyer's agent who is a registered user of the disclosed application and who is a licensed real estate agent accesses his/her account using his/her computing device (preferably a mobile (smartphone) phone). At Step 22, the buyer agent/user selects "Send Earnest Money Check" functionality from the menu offered per the UI of the application. Prompted to capture a photographic image of the earnest money check, per Step 23, the user takes photo of the earnest money check written by the buyer that is the buyer party to the relevant real estate purchase agreement. At Step 24, the user is prompted to click the "Upload Image of Earnest Money Check." Images are captured of both the front face of the check and, as may be required by the relevant financial institution, the back face of the check. After uploading of the earnest money check image, the user receives a communication from the application that the upload was either successful or that is was unsuccessful. If unsuccessful, the user is prompted to try again. If successful, the user, per Step 25, inputs buyer identifying information. At Step 26, per the user inputs earnest money check information comprising check amount and payee. Per Step 27, the user specifies the destination title company for the earnest check from a provided dropdown listing of title companies and title company branches as per a Title Company Database of the application server. At Step 28 the user clicks "Send Earnest Money Check Information." At Step 29 the user awaits confirmation from the application server that the check was received and if received properly, the application server automatically sends to the user a notification confirming the payment, wherein the confirmation comprises a unique Transaction URL that is a unique identifier for that earnest money check payment. The confirmation step also includes checking for duplicate checks/transactions. It is noted that the paper check that the buyer delivers to his/her agent is typically retained by the buyer in his/her records for safekeeping. The check image and check-related information are captured in a single file that is formatted in an approved format, preferably as an X9.37 file.

FIG. 5 is a schematic giving an overview of the prior art method and disclosed method for processing of an option fee check in a real estate purchase transaction.

Figure 6:
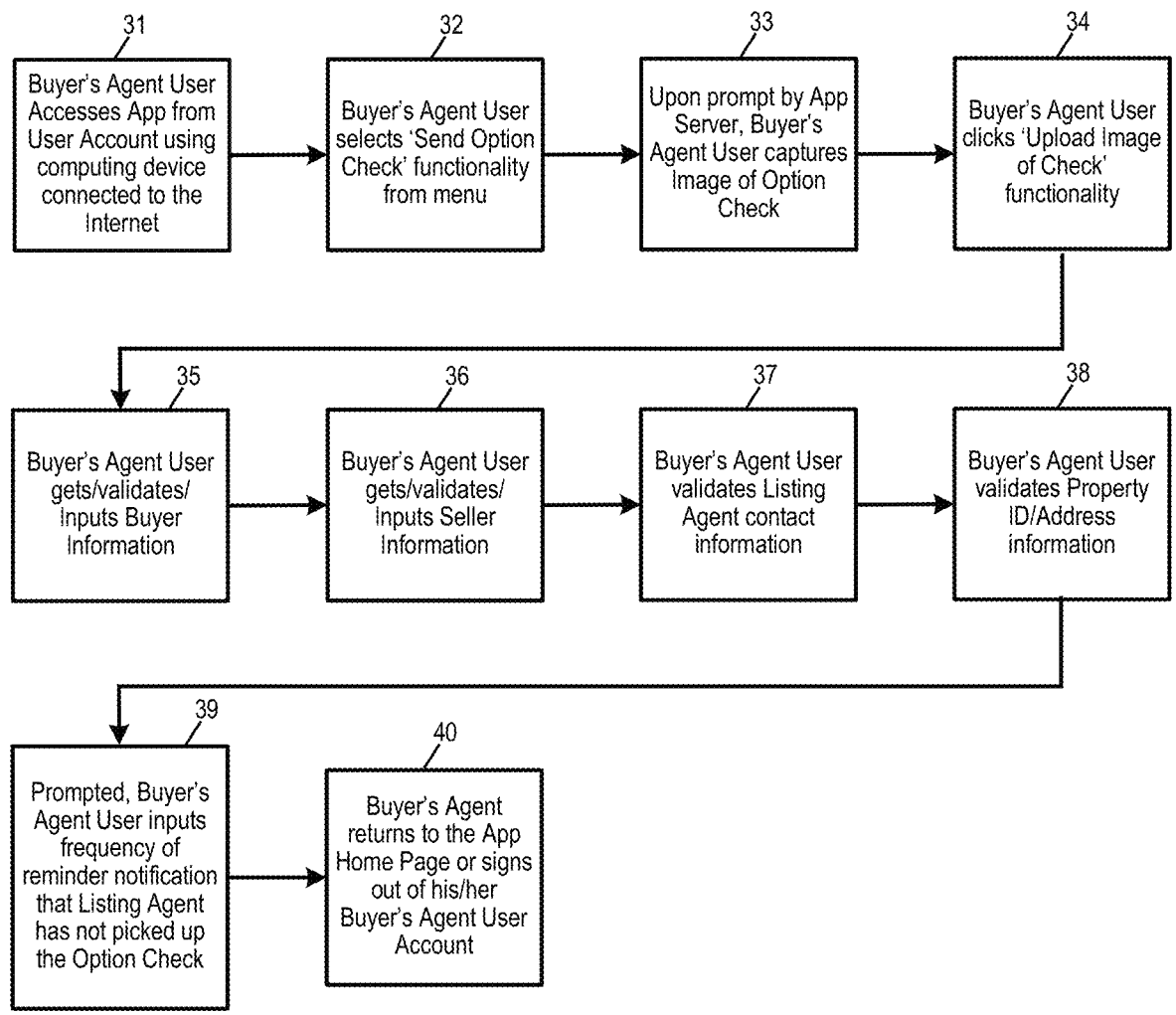
FIGS. 6 and 6A are block diagrams showing steps in practicing the disclosed method for processing of an option fee check in a real estate purchase transaction in accordance with an embodiment of the disclosed process.
Figure 6A:
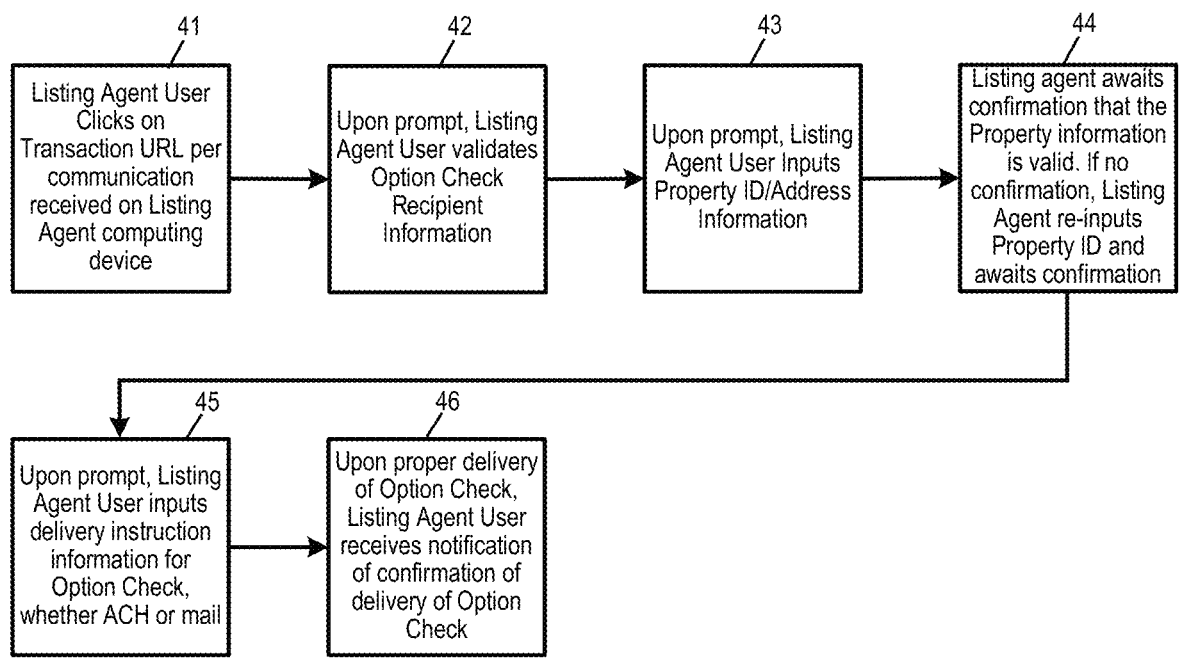

FIGS. 6 and 6A are block diagrams showing steps in practicing the disclosed method for processing of an option fee check in a real estate purchase transaction in accordance with one embodiment. Accordingly, per Step 31, the buyer's agent who is a registered user of the disclosed application accesses his/her account using his/her computing device (preferably a mobile phone). At Step 32, from the menu of functionalities of the UI, the buyer's agent/user selects "Send Option Check Functionality." At Step 33, the buyer's agent/user is prompted to capture a photo image of the option check written by the buyer and handed to the buyer's agent. At Step 34, the buyer's agent performs the "Upload image of Option Check" functionality. Per Step 35, the buyer's agent inputs/validates buyer identifying information. Per Step 36, the buyers' agent inputs/validates seller identifying information. Per Step 37, the buyer's agent inputs/validates listing agent identifying, listing agent contact information. At Step 38, the buyer's agent/user inputs/validates the real property identifying information, comprising the property address. Prompted by the UI, at Step 39 the buyer's agent/user specifies the desired frequency of automatic reminder notifications that the application shall send to the buyer's agent, the listing agent, and any associated brokers (as appropriate), during the period that the option check has not been accessed by the listing agent.

Per FIG. 6A, at Step 41, the listing agent, upon receiving a notification of an option check payment, clicks on the Transaction URL that is contained as a link in the notification. At Steps 42 and 43, the listing agent is prompted to input information in order to authenticate/validate recipient (seller) identifying information and the real property identifying information using one or more of the authentication methods described above. At Step 44, the listing agent awaits confirmation that the option check recipient is validated. At Step 45, the listing agent is prompted to input the preferred method of delivery of the option check to the validated seller, whether via e-mail (containing a link for ACH) or via US mail. Per Step 46, the application server sends automatic notifications to all users, the buyer's agent, the listing agent and any brokers (as appropriate) when the listing agent has successfully accessed the link containing the URL alter successfully validating the recipient/seller and property information. Real estate brokers can opt to be copied on all notifications disclosed herein that are generated by the application service, and can view all of the brokers' agents' transactions by agent and status.

Figure 7:
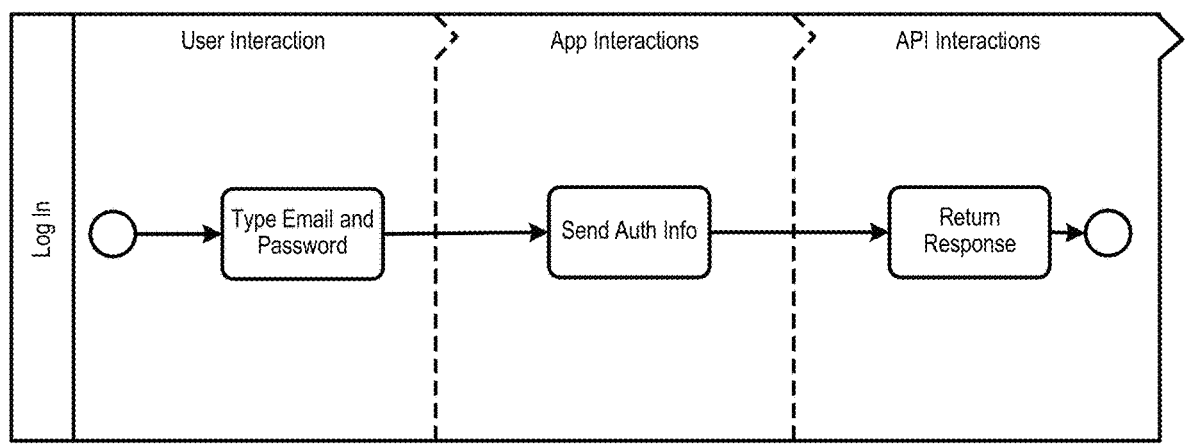
FIG. 7 is a schematic of a process flow for the user's 'log in' functionality in accordance with an embodiment of the disclosed application for payment processing.
Figure 8:
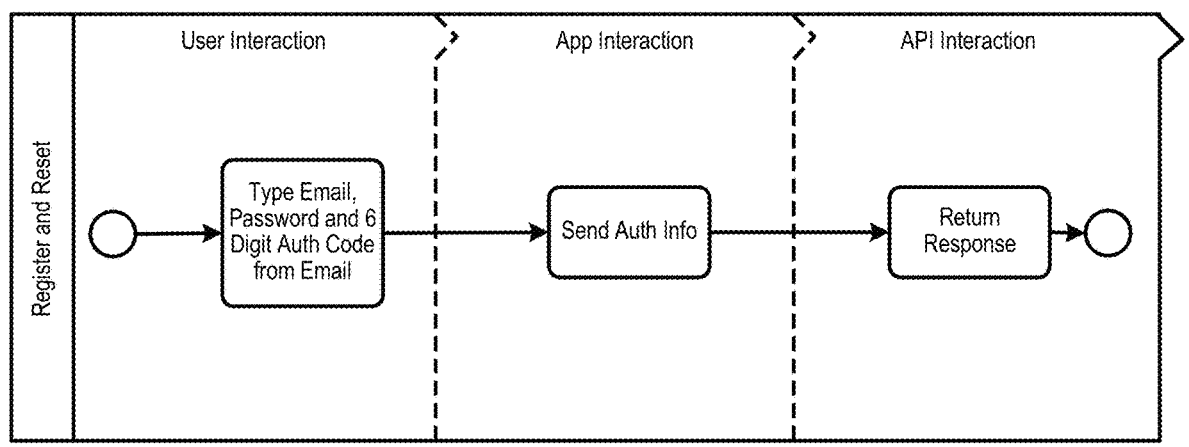
FIG. 8 is a schematic is a schematic of a process flow for the user's 'register and reset' functionality in accordance with the preferred embodiment of the disclosed mobile-enabled application for payment processing.

FIGS. 7 through 11 depict programmatic process flows and highlight the interfaces from user (UI) to application (application server or service) to the API in connection with specific functionalities carried out by the application. Accordingly, FIG. 7 is a schematic of a process flow for the user's 'log in' functionality in accordance with an embodiment of the disclosed application for payment processing. FIG. 8 is a schematic is a schematic of a process flow for the user's 'register and reset' functionality in accordance with the preferred embodiment of the disclosed mobile-enabled application for payment processing.

Figure 9:
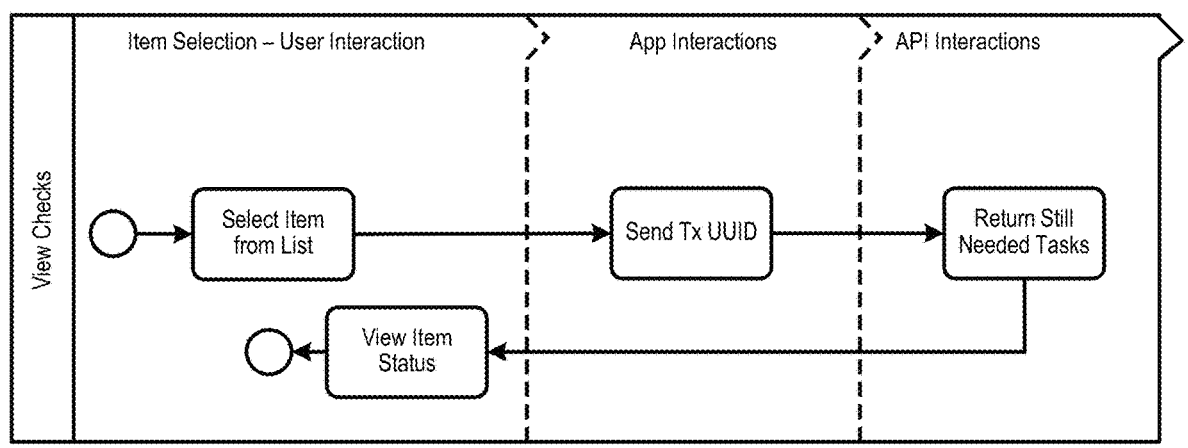
FIG. 9 is a schematic of a process flow for the 'view checks' functionality in accordance with the preferred embodiment of the disclosed mobile-enabled application for payment processing.

FIG. 9 is a schematic of a process flow for the 'view checks' functionality in accordance with the preferred embodiment of the disclosed mobile-enabled application for payment processing.

Figure 10:
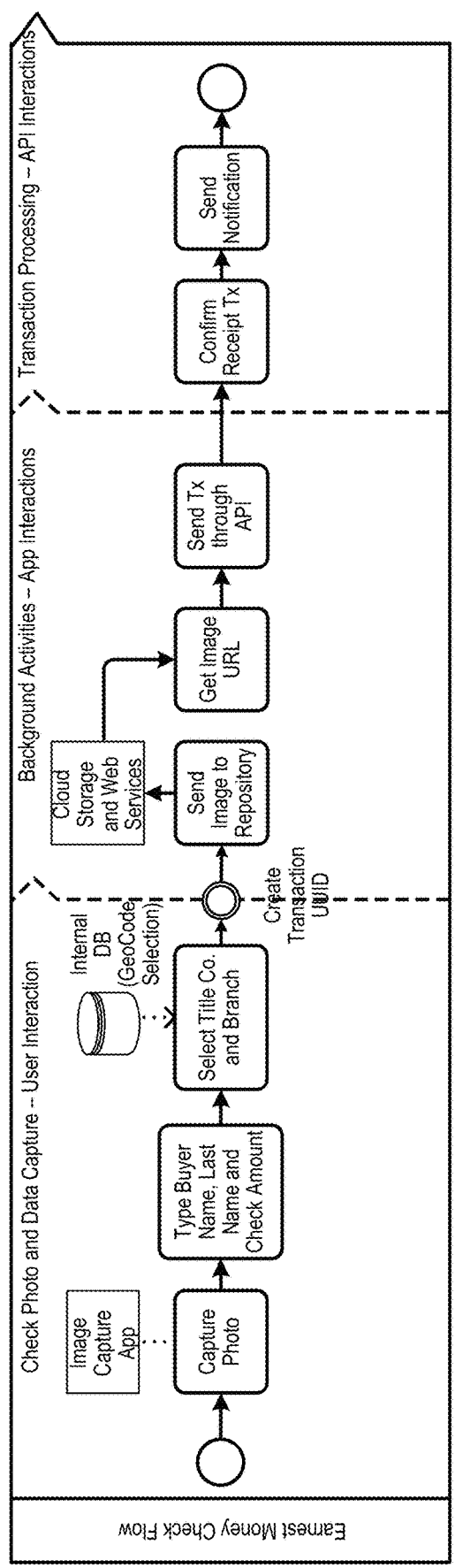
FIG. 10 is a schematic of a process flow for earnest money payments in accordance with the preferred embodiment of the disclosed mobile-enabled application for payment processing.
Figure 11:
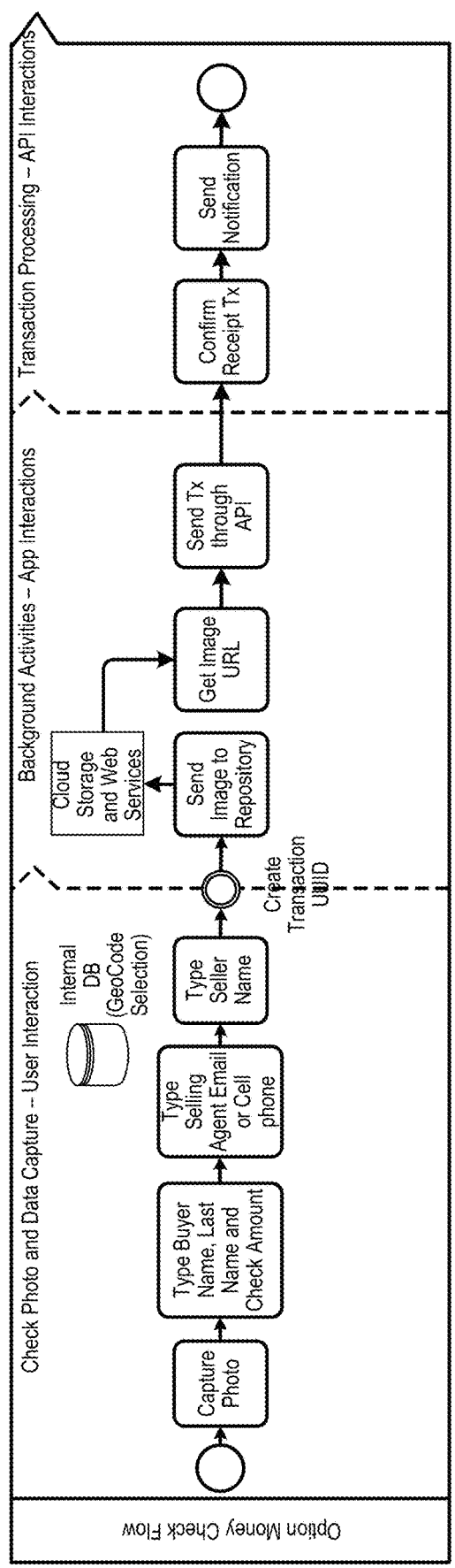
FIG. 11 is a schematic of a process flow for option money check payments in accordance with the preferred embodiment of the disclosed mobile-enabled application for payment processing.

FIG. 10 is a schematic of a process flow for earnest money payments in accordance with the preferred embodiment of the disclosed mobile-enabled application for payment processing. FIG. 11 is a schematic of a process flow for option money check payments in accordance with the preferred embodiment of the disclosed mobile-enabled application for payment processing.

Figure 12:
FIG. 12 is a sample screen shot that is part of the UI for processing of earnest money payments in accordance with the preferred embodiment of the disclosed mobile-enabled application for payment processing.
Figure 15:
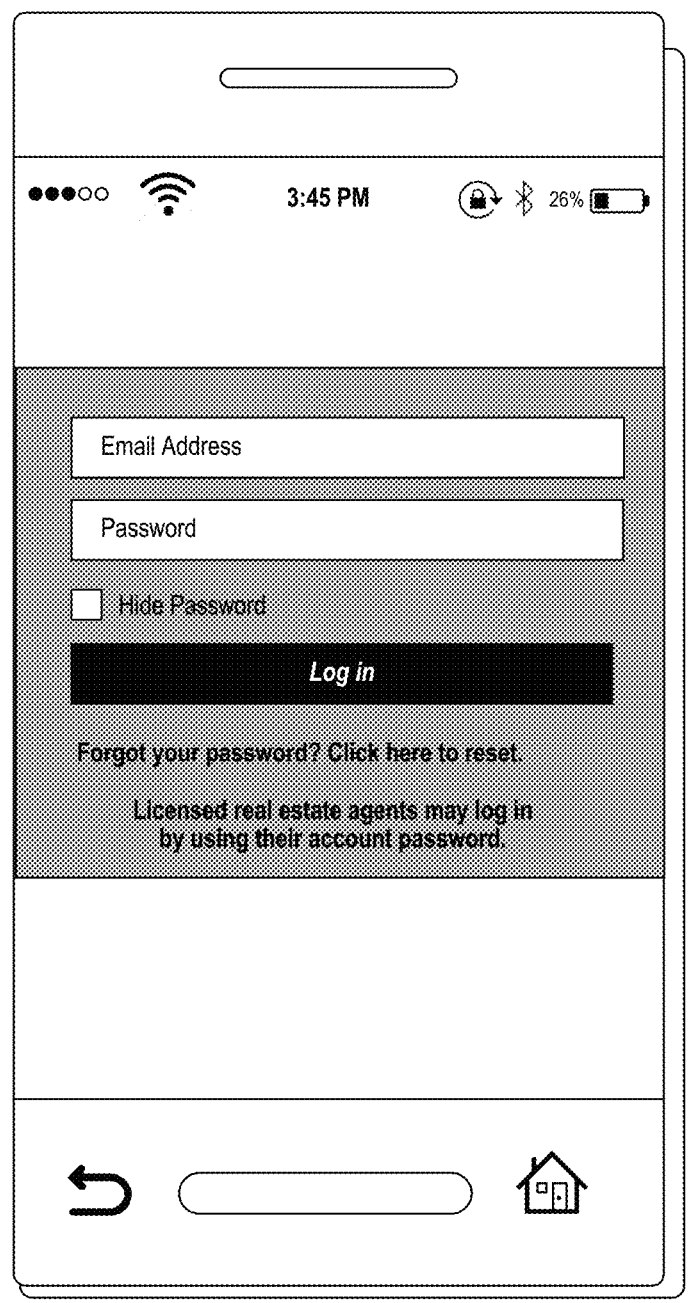
FIGS. 15 through 22 are representative sample UIs per the disclosed preferred embodiment for a mobile phone-compatible application for processing of physical checks in real estate transactions.
Figure 16:
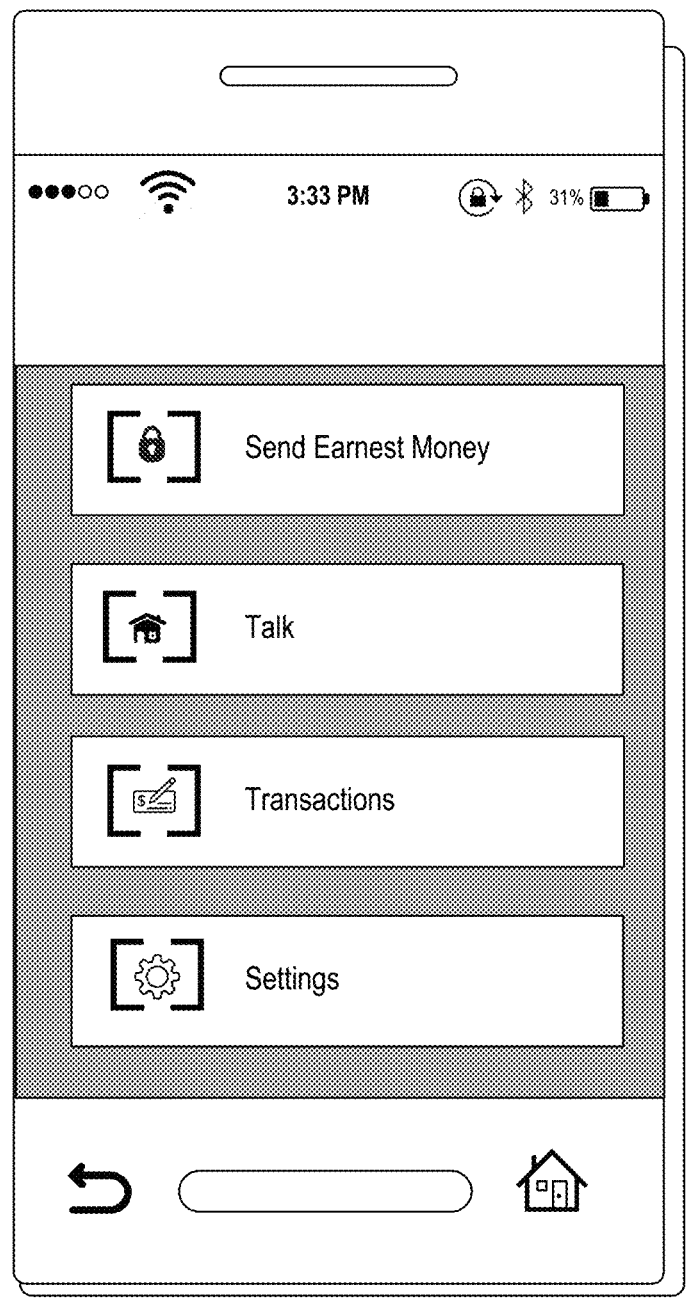
Figure 17:
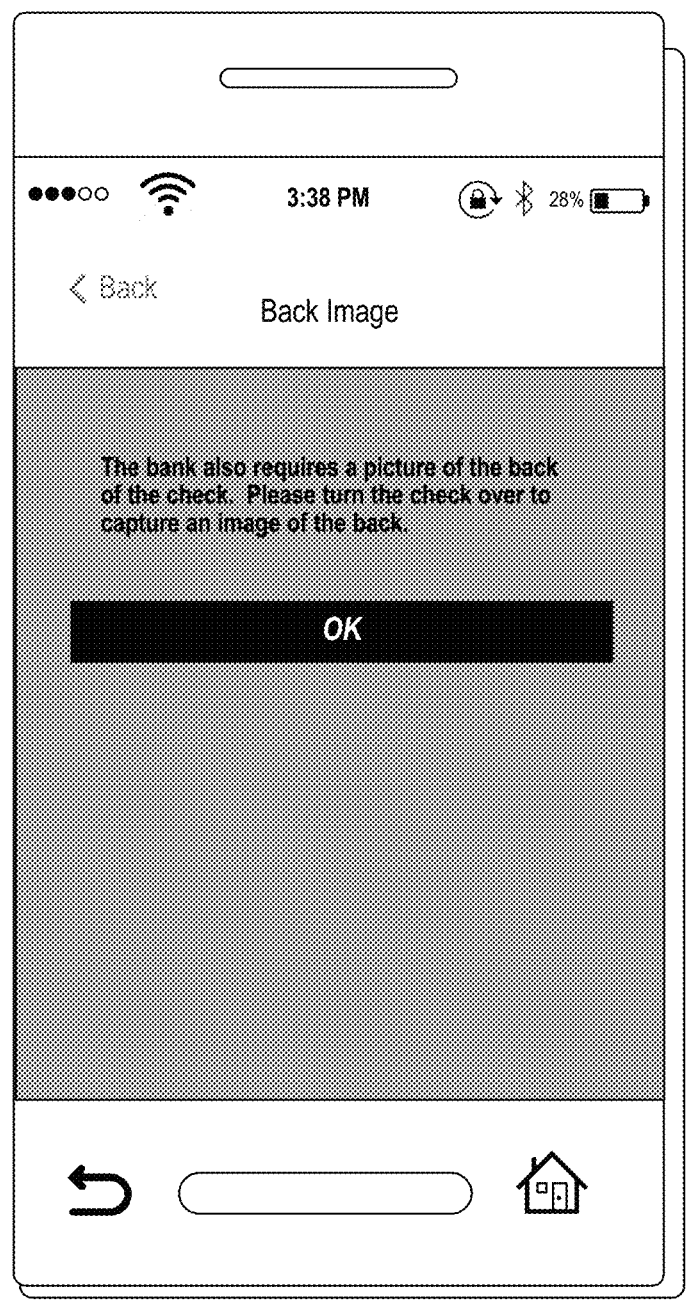
Figure 18:
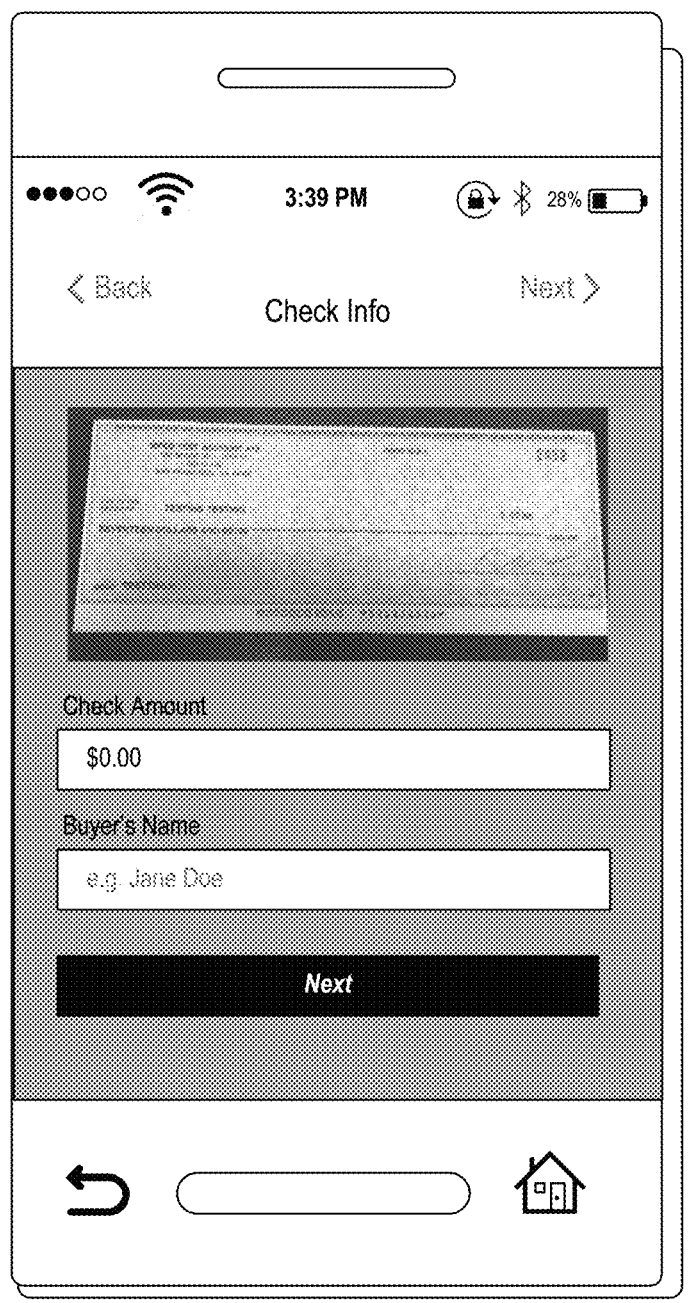
Figure 19:
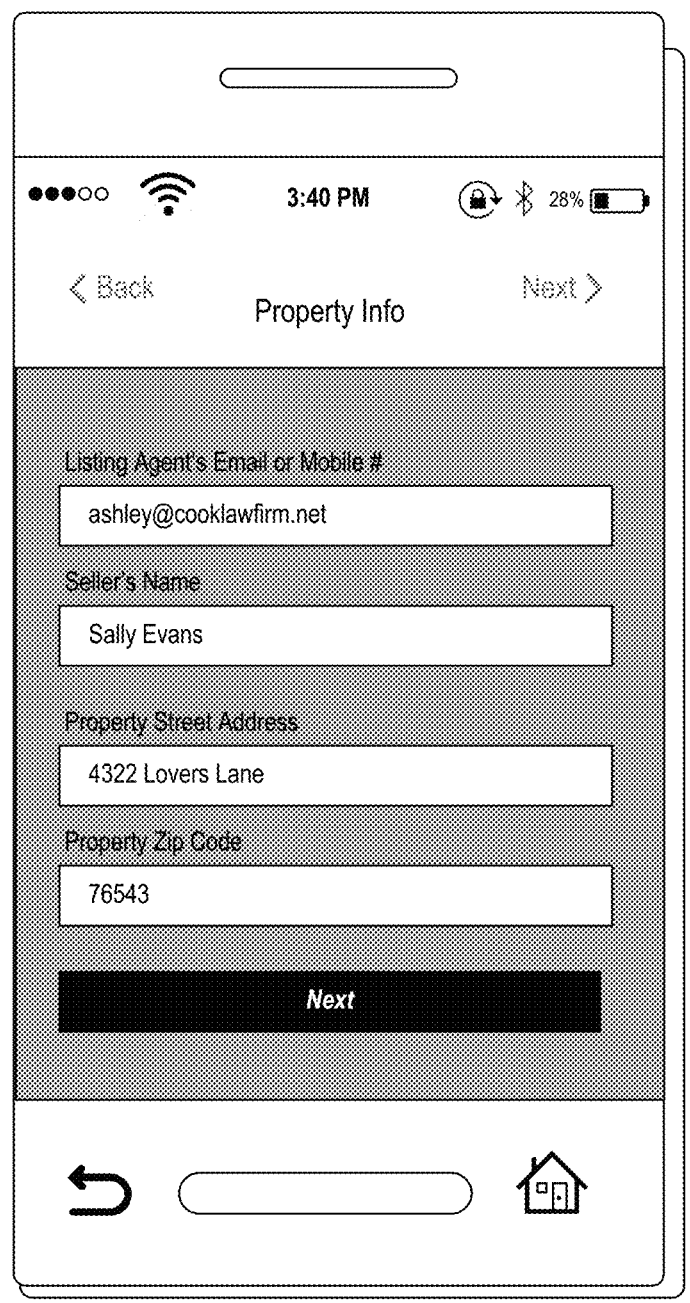

FIG. 12 is a sample screen shot that is part of the UI for processing of earnest money payments in accordance with the preferred embodiment of the disclosed mobile-enabled application for payment processing.

FIG. 13 is a sample screen shot that is part of the UI for processing of option fee money payments in accordance with the preferred embodiment of the disclosed mobile-enabled application for payment processing.

FIG. 14 is an example of a payment confirmation e-mail communication sent by the application server to an authorized representative of a title company who is an authenticated subscriber of the application. The e-mail preferentially contains at least the following information: (1) property address, (2) earnest money check amount, (3) buyer name, (4) seller name, (5) name of the Title Company and branch, (6) date of delivery of the earnest money check and (7) a link to the captured images of the front face and back face of the earnest money check.

Figure 20:
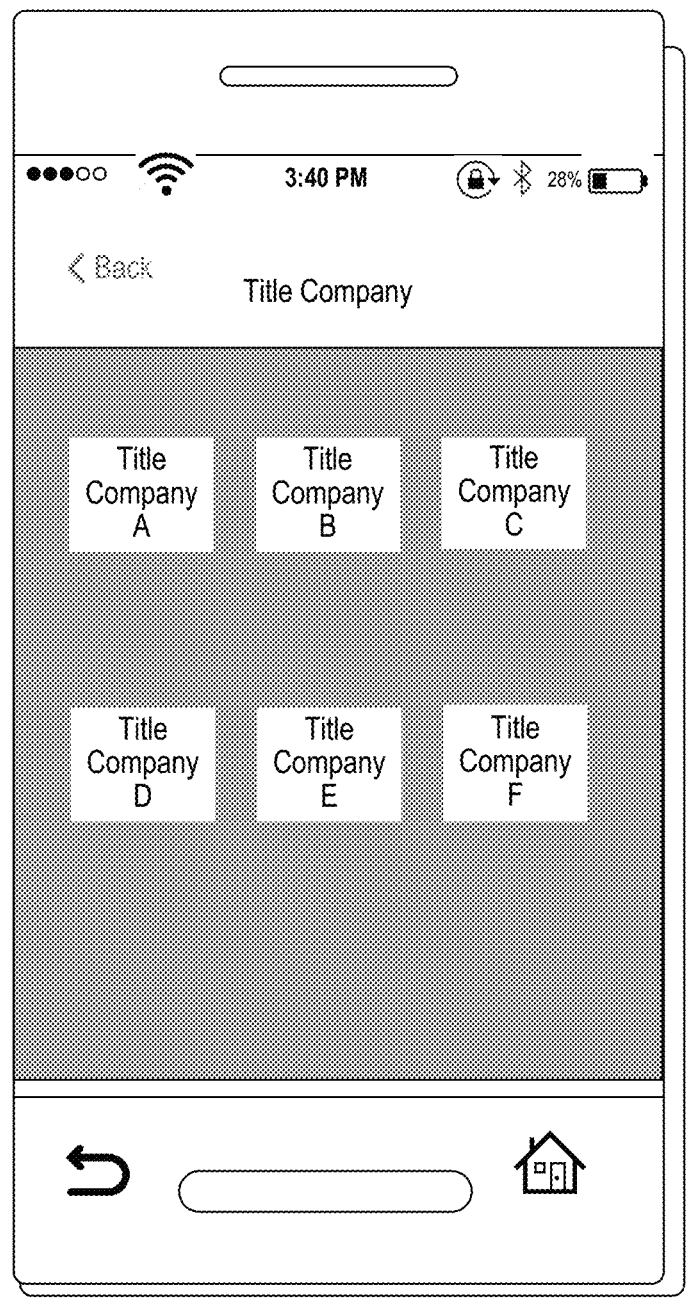
Figure 21:
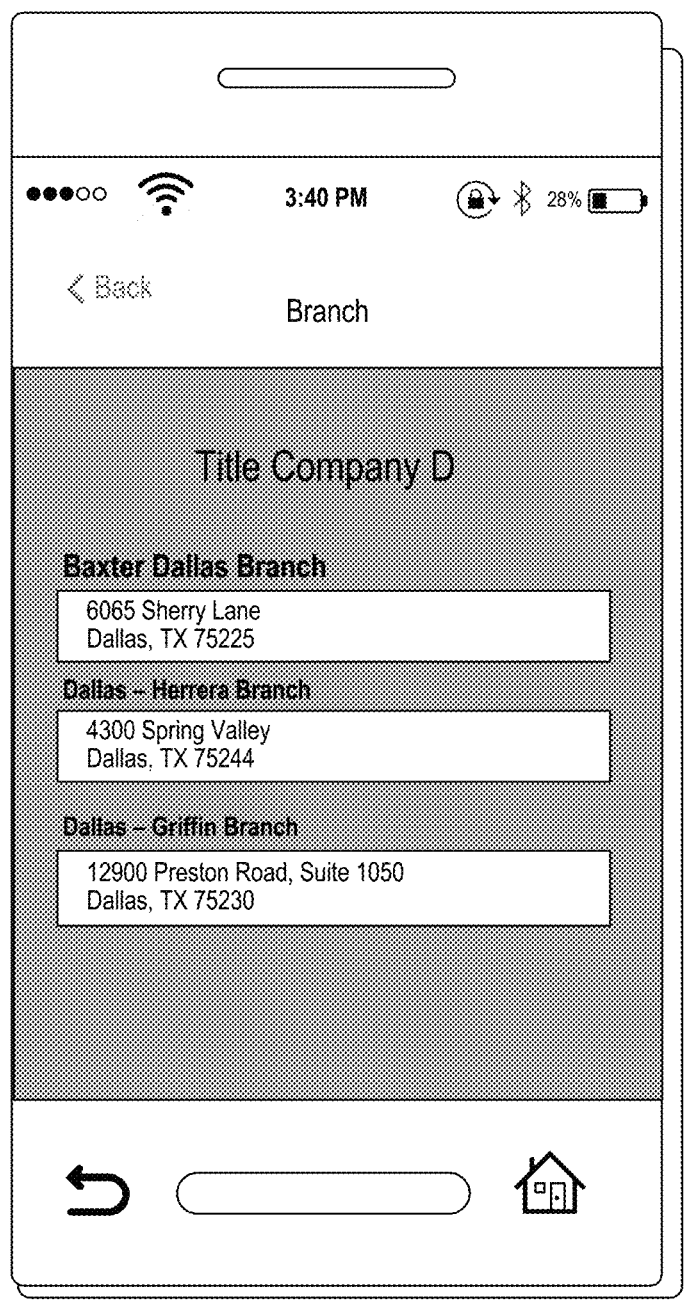
Figure 22:
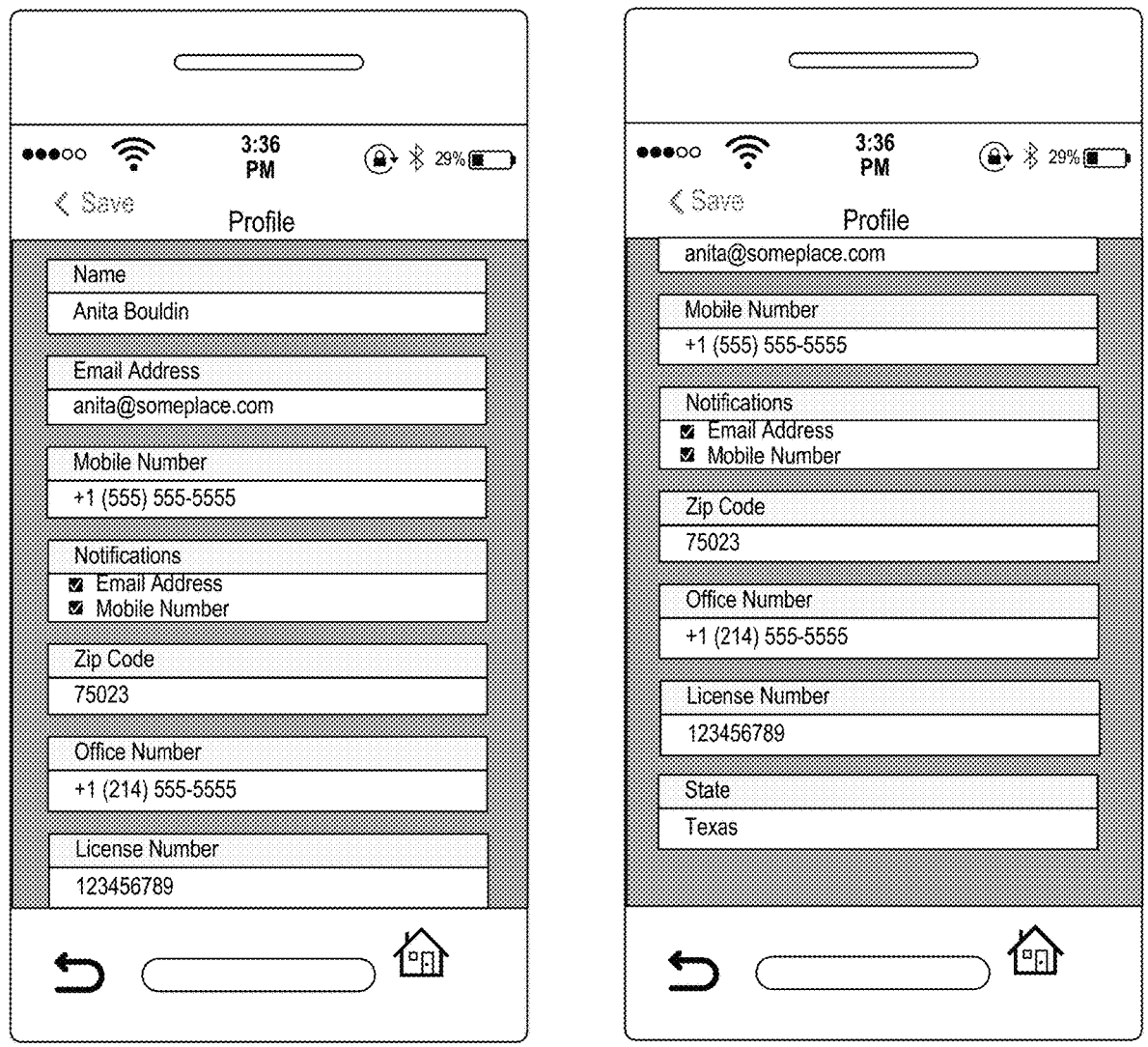

FIGS. 15 through 22 are representative sample UIs per the disclosed preferred embodiment for a mobile phone-compatible application for processing of physical checks in real estate transactions. FIGS. 20 and 21 show sample UIs wherein users may select a title company and title company branch, respectively as an intended recipient of the check payment being processed via the application. FIG. 22 shows a sample profile of a subscribing buyer agent user of the application. Thus, the disclosed is a graphical user interface for a user's computing device comprising instructions stored on a non-transitory computer-readable medium causing the computer to display the following items via a display apparatus of the user's computing device:

a. A visual prompt for the user to input the user's real estate license number, b. A visual prompt for the user to select a type of physical check to be processed, where the type of check is in the group comprising earnest money check and option check, c. A visual prompt for the user to capture an image of a front face and a back face of a physical check to be processed and d. A user prompt to input a title company that is the intended recipient of the check to be processed if the check to be processed is an earnest money check.

It will be obvious to one of ordinary skill in the relevant art that the disclosed invention is not limited to the particular embodiments and UIs described herein. Furthermore, while the invention is described with respect to processing of earnest money checks and option checks where the buyer's agent initiates the check payment processing request, the system and methods of the disclosed invention, including authenticated users and user portals for users that also comprise brokers, title company clerks and managers and seller agents, also encompass processing of agent commission checks and other check payments typically made in connection with real estate purchase transactions involving real estate agents who represent buyers and sellers.

I claim:

1. A system for managing and processing transaction data related to a real estate transaction, the system comprising:

a database configured to store authorized user information including a plurality of real estate license numbers associated with a plurality of authorized users, a plurality of recipient identifiers corresponding to a plurality of recipients for receiving transaction data, and a plurality of unique data files each representative of transaction data related to a real estate transaction of a plurality of real estate transactions;

a plurality of computing devices configured to acquire transaction data related to a plurality of real estate transactions between a plurality of buyers and a plurality of sellers;

an application server communicatively coupled to the database and the plurality of computing devices over a communication network, the application server configured, for each of the plurality of real estate transactions, to:

authenticate access to the application server by a first computing device operated by a first user, the first computing device authenticated based on a comparison of data indicative of a real estate license number received from the first computing device with the plurality of real estate license numbers stored in the database, receive, when the first computing device is authenticated, from the first computing device, the transaction data acquired by the first computing device and related to a transaction between a buyer of the plurality of buyers and a seller of the plurality of sellers, the transaction data comprising information of an account of the buyer, a buyer identifier of the buyer, and a recipient identifier of an intended recipient of the transaction data, wherein the first user is not the buyer and the intended recipient is different than the seller, and transmit the transaction data and the recipient identifier to a payment processing server without input from the intended recipient; and the payment processing server coupled to a payment database in communication with the application server, the payment processing server configured to transfer the received transaction data to an account associated with the intended recipient based on the received recipient identifier from the application server thereby creating a binding contract for the transaction between the buyer and the seller, wherein the application server is further configured to:

generate a unique data file, store the unique data file as one of the plurality of unique data files stored on the database, and generate a link to the unique data file, the unique data file being representative of the transaction data, automatically in response to transmitting the transaction data to the payment processing server, transmit the link to the unique data file to the intended recipient based on the recipient identifier, and generate and transmit a unique notification file to the first user via the communication network in response to the transaction data being successfully transferred to the account associated with the intended recipient, wherein the transmission of the link and the unique notification file are indicative of creation of the binding contract for the transaction between the buyer and the seller; and wherein the first computing device is configured to:

capture one or more images of a check drawn on an account associated with the buyer;

execute image processing on the one or more images of the check to verify the captured one or more images conforms with one or more image quality requirements; and in response to successful verification, extract the transaction data from the one or more images of the check.

2. The system of claim 1, wherein the communication network is a mobile network and the first computing device is a mobile phone.

3. The system of claim 1, wherein the first user is a licensed real estate buyer's agent and the transaction data is related to an earnest money check payment request.

4. The system of claim 1, wherein the first user is an agent of the buyer and the intended recipient is an escrow agent.

5. The system of claim 1, wherein the transaction data is derived from an image of an earnest money check related to the real estate transaction, wherein the check is drawn from the account of the buyer.

6. The system of claim 1, wherein automatically transmitting the link to the unique data file to the intended recipient is transmitted approximately simultaneously in response to transmitting the transaction data to the payment processing server.

7. The system of claim 1, wherein the database does not store information related to the account associated with the intended recipient.

8. The system of claim 1, wherein the application server is further configured encrypt and protect the transaction data and the intended recipient via secure socket layer.

9. A method for processing and managing transaction data in connection with real estate transactions, the method comprising:

storing authorized user information including a plurality of real estate license numbers associated with a plurality of authorized users, a plurality of escrow agent identifiers corresponding to a plurality of escrow agents for receiving transaction data, a plurality of financial institution identifiers corresponding to the plurality of escrow agent identifiers, and a plurality of unique data files each representative of transaction data related to a plurality of real estate transactions;

capturing, by a first user device operated by a first user, one or more images of a check drawn on an account associated with a buyer;

executing, by the first user device operated by the first user, image processing on the one or more images of the check to verify the captured one or more images conforms with one or more image quality requirements;

extracting, by the first user device operated by the first user, in response to successful verification, transaction data from the one or more images of the check, the transaction data related to a transaction for a property between a buyer and a seller, the transaction data comprising the one or more images of the check executed by the buyer intended for an escrow agent, the buyer being different than the first user;

authenticating access for the first user and accessing an application server, by the first user device, for processing of the transaction data, wherein the authenticating is based on a comparison of data indicative of a real estate license number from the first user device with the plurality of real estate license numbers stored in a database coupled to the application server;

receiving, by the application server, when the first user device is authenticated, the transaction data from the first user device extracted from the captured transaction data, the transaction data comprising a buyer identifier corresponding to the buyer, a property identifier corresponding to the property of the transaction, an escrow agent identifier associated with the escrow agent, and information of an account associated with the buyer;

generating, by the application server, a unique data file, storing the unique data file as one of the plurality of unique data files, and generating a link to the unique data file, the unique data file being representative of the transaction data;

transmitting, by the application server, the transaction data and the escrow agent identifier to a financial institution based on a financial institution identifier associated with an escrow account identifier to cause a deposit into an account of the escrow agent without input from the escrow agent thereby creating a binding contract for the transaction between the buyer and the seller;

automatically generating and transmitting, by the application server, in response to the transmission to the financial institution, a notification to the escrow agent based on the escrow agent identifier, the notification comprising the link to the unique data; and automatically generating and transmitting, by a communication network, in response to the deposit into the account of the escrow agent, a unique confirmation file to the first user device, wherein the transmission of the notification to the escrow agent and the unique confirmation file to the first user device are indicative of creation of the binding contract for the transaction between the buyer and the seller.

10. A non-transitory computer-readable storage medium comprising one or more programs including instructions that when executed by one or more processors, cause the one or more processors to perform operations comprising the steps of:

storing authorized user information including a plurality of real estate license numbers associated with a plurality of authorized users, a plurality of escrow agent identifiers corresponding to a plurality of escrow agents for receiving transaction data, a plurality of financial institution identifiers corresponding to the plurality of escrow agent identifiers, and a plurality of unique data files each representative of transaction data related to a plurality of real estate transactions;

capturing, by a first user device operated by a first user, one or more images of a check drawn on an account associated with a buyer;

executing, by the first user device operated by the first user, image processing on the one or more images of the check to verify the captured one or more images conforms with one or more image quality requirements;

extracting, by the first user device operated by the first user, in response to successful verification, transaction data from the one or more images of the check, the transaction data related to a transaction for a property between a buyer and a seller, the transaction data comprising the one or more images of the check executed by the buyer intended for an escrow agent, the buyer being different than the first user;

authenticating access for the first user and accessing an application server, by the first user device, for processing of the transaction data, wherein the authenticating is based on a comparison of data indicative of a real estate license number from the first user device with the plurality of real estate license numbers stored in a database coupled to the application server;

receiving, by the application server, when the first user device is authenticated, the transaction data from the first user device extracted from the captured transaction data, the transaction data comprising a buyer identifier corresponding to the buyer, a property identifier corresponding to the property of the transaction, an escrow agent identifier associated with the escrow agent, and information of an account associated with the buyer;

generating, by the application server, a unique data file, storing the unique data file as one of the plurality of unique data files, and generating a link to the unique data file, the unique data file being representative of the transaction data;

transmitting, by the application server, the transaction data and the escrow agent identifier to a financial institution based on a financial institution identifier associated with an escrow account identifier to cause a deposit into an account of the escrow agent without input from the escrow agent thereby creating a binding contract for the transaction between the buyer and the seller;

automatically generating and transmitting, by the application server, in response to the transmission to the financial institution, a notification to the escrow agent based on the escrow agent identifier, the notification comprising the link to the unique data file; and automatically generating and transmitting, by a communication network, in response to the deposit into the account of the escrow agent, a unique confirmation file to the first user device, wherein the transmission of the notification to the escrow agent and the unique confirmation file to the first user device are indicative of creation of the binding contract for the transaction between the buyer and the seller.

11. The non-transitory computer-readable medium of claim 10, wherein the first user is a buyer's agent in a real estate purchase and sale transaction, the user authentication comprises verification of a real estate license information of the buyer's agent, and the check is an earnest money check.

* * * * *